(12) United States Patent
Oveyssi

(10) Patent No.: US 6,888,697 B1
(45) Date of Patent: May 3, 2005

(54) DISK DRIVE HAVING A DISK PLATE BODY ATTACHED TO A FIXED SPINDLE SHAFT OF A SPINDLE MOTOR

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 98 days.

(21) Appl. No.: 10/425,897

(22) Filed: Apr. 28, 2003

(51) Int. Cl.[7] .............................................. G11B 33/08
(52) U.S. Cl. ................................................ 360/97.02
(58) Field of Search ....................... 360/99.08, 97.01, 360/97.02

(56) References Cited

U.S. PATENT DOCUMENTS

| | | | | | |
|---|---|---|---|---|---|
| 4,965,686 | A | * | 10/1990 | Young et al. | 360/99.08 |
| 5,081,552 | A | * | 1/1992 | Glaser et al. | 360/98.01 |
| 5,282,100 | A | * | 1/1994 | Tacklind et al. | 360/97.02 |
| 5,483,397 | A | * | 1/1996 | Gifford et al. | 360/97.02 |
| 5,587,588 | A | * | 12/1996 | Kim | 360/97.02 |
| 5,781,373 | A | * | 7/1998 | Larson et al. | 360/97.02 |
| 6,256,165 | B1 | * | 7/2001 | Kim | 360/97.01 |
| 6,504,672 | B1 | * | 1/2003 | Janik et al. | 360/97.02 |
| 2002/0135933 | A1 | | 9/2002 | Harrison et al. | |
| 2003/0048576 | A1 | * | 3/2003 | Sohn et al. | 360/99.08 |

FOREIGN PATENT DOCUMENTS

| | | | | | |
|---|---|---|---|---|---|
| JP | 05258545 | A | * | 10/1993 | G11B/33/08 |
| JP | 10112174 | A | * | 4/1998 | G11B/33/08 |
| JP | 2001202682 | A | * | 7/2001 | G11B/33/08 |

* cited by examiner

Primary Examiner—Craig A. Renner
(74) Attorney, Agent, or Firm—Won Tae C. Kim, Esq.

(57) ABSTRACT

A disk drive includes an enclosure including a disk drive base and a disk drive cover, a disk for storing data, a spindle motor attached to the disk drive base, the spindle motor for rotating the disk and including a fixed spindle shaft defining a longitudinal axis, and a disk plate attached to the disk drive base. The disk plate includes a plate body extending radially above the disk and spaced-apart longitudinally from the disk. The plate body is attached to the fixed spindle shaft.

2 Claims, 2 Drawing Sheets

DISK DRIVE HAVING A DISK PLATE BODY ATTACHED TO A FIXED SPINDLE SHAFT OF A SPINDLE MOTOR

BACKGROUND OF THE INVENTION

1. Field of the Invention

This invention relates to a disk plate for a disk drive. More particularly, this invention relates to a plate body of the disk plate being attached to a fixed spindle shaft of a spindle motor.

2. Description of the Prior Art and Related Information

A huge market exists for disk drives such as hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 40 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations. Actuator arrangements can be characterized as either linear or rotary; substantially every contemporary cost-competitive small form factor drive employs a rotary actuator arrangement.

Another requirement to be competitive in this market is that the hard disk drive must be relatively quiet, especially in applications such as the consumer electronics market. One contributor to the acoustic noise generated by a hard disk drive is the structural vibration of a fixed spindle shaft motor, which is transmitted to a disk drive cover. Structural vibrations are caused by the eccentric motion, gyroscopic motion, and/or axial motion of the fixed spindle shaft motor. Spindle motors may have either a non-rotating spindle shaft ("fixed spindle shaft") or a rotating spindle shaft.

In a spindle motor having a fixed spindle shaft ("fixed spindle shaft motor"), the fixed spindle shaft is typically attached to the disk drive cover via a suitable fastener such as a screw. In such an arrangement, the structural vibrations of such fixed spindle shaft motors are transmitted to the disk drive cover when the spindle motor rotates during an operation of the hard disk drive. Hence, the disk drive cover vibrates which contribute to the acoustic noise generated by the hard disk drive.

SUMMARY OF THE INVENTION

This invention can be regarded as a disk drive including an enclosure including a disk drive base and a disk drive cover, a disk for storing data, a spindle motor attached to the disk drive base, the spindle motor for rotating the disk and including a fixed spindle shaft defining a longitudinal axis, and a disk plate attached to the disk drive base. The disk plate includes a plate body extending radially above the disk and spaced-apart longitudinally from the disk, the plate body attached to the fixed spindle shaft.

DETAILED DESCRIPTION OF PREFERRED EMBODIMENTS

Figure 2A:
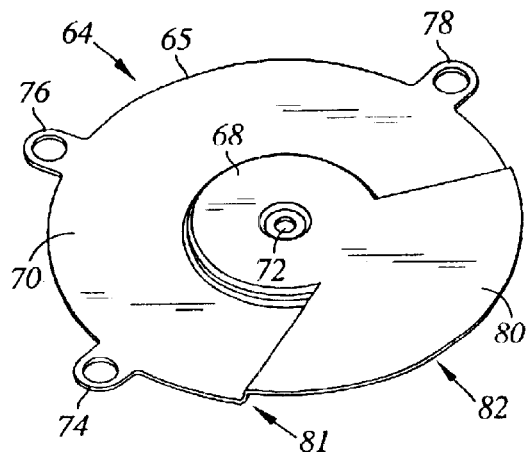
FIG. 2a is a perspective view of the disk plate shown in FIG. 1.
Figure 3:
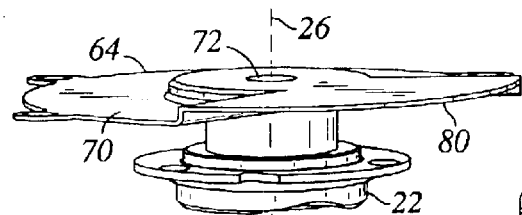
FIG. 3 is a perspective view of a disk plate attached to a fixed spindle shaft motor.
Figure 4:
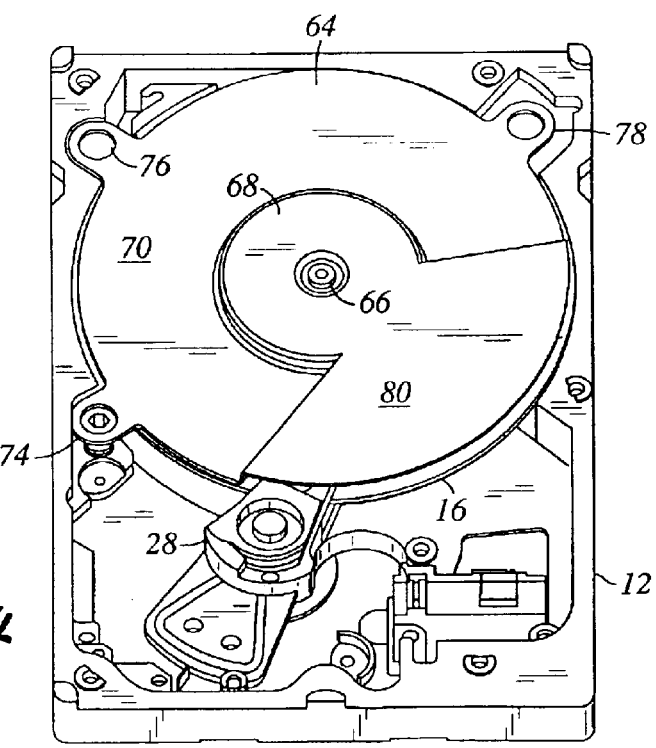
FIG. 4 is a perspective view of the disk drive of FIG. 1 with some components removed such as the disk drive cover.

With reference to FIGS. 1, 2a, 3, and 4, a disk drive 10 includes an enclosure including a disk drive base 12 and a disk drive cover 14, a disk 16 for storing data, a spindle motor 22 attached to disk drive base 12, spindle motor 22 for rotating disk 16 and including a fixed spindle shaft 24 defining a longitudinal axis 26, and a disk plate 64 attached to disk drive base 12. Disk plate 64 includes a plate body 65 extending radially above disk 16 and spaced-apart longitudinally from disk 16, plate body 65 attached to fixed spindle shaft 24, as best shown in FIG. 4. Since plate body 65 is spaced-apart longitudinally from disk 16, disk 16 is allowed to freely rotate. In one embodiment, spindle motor 22 may be a ball bearing motor. In another embodiment, spindle motor 22 may be a fluid dynamic bearing motor ("FDB" motor). In the embodiment shown in FIG. 1, a disk drive having a single disk is shown. In alternative embodiments, a plurality of disks may be used with a respective magnetic head associated with a respective recording surface of a disk.

Figure 1:
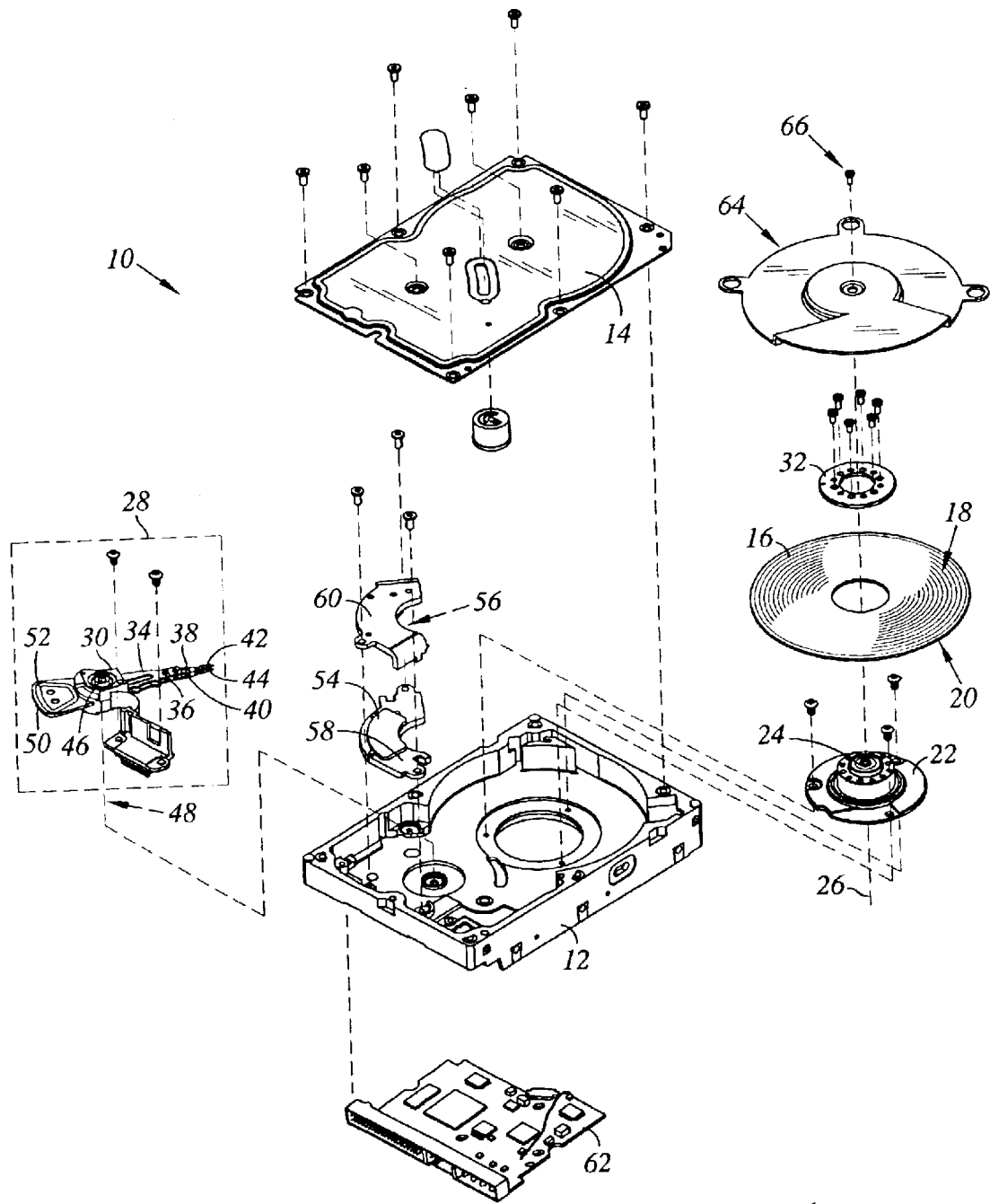
FIG. 1 is an exploded perspective view of a disk drive in accordance with an embodiment of this invention.

Continuing with FIG. 1, disk drive 10 further includes a printed circuit board assembly 62 for attachment to the bottom of disk drive base 12, disk clamp 32 for clamping disk 16 to spindle motor 22, and a fastener 66 for attaching plate body 65 to fixed spindle shaft 24. Disk 16 includes a top recording surface 18 and a bottom recording surface 20, each recording surface for storing data. Disk drive 10 further includes a permanent magnet arrangement generally defined by magnet plates and 60, each magnet plate having a respective magnet 54 and 56. Disk drive 10 further includes a head stack assembly 28 which includes an actuator body 30, a pivot bearing cartridge 46 installed in a bore of actuator body 30, a pair of actuator arms 34, 36, a pair of head gimbal assemblies 38, 40, each head gimbal assembly having a respective magnetic head 42, 44. Head stack assembly 28 further includes a coil portion 50 having a voice coil 52 and head stack assembly 28 pivots relative to a pivot axis 48 defined by the bore of actuator body 30.

With reference to FIGS. 2a, 3, and 4, disk plate 64 includes plate body 65 and a plurality of fastening members 74, 76, and 78 disposed around the periphery of plate body 65. Fastening members 74, 76, and 78 are used to attach disk plate 64 to disk drive base 12 as best shown in FIG. 4. Each fastening member may mate with a corresponding post extending from base 12 or alternatively, fasteners, such as screws, may be used to attach disk plate 64 to disk drive base 12 via corresponding apertures in fastening members 74, 76, and 78. Plate body 65 includes an inner body portion 68 and a generally C-shaped outer body portion 70, inner body portion 68 being spaced-apart longitudinally at a distance greater from disk 16 than outer body portion 70. Plate body 65 further includes an aperture 72 concentric with fixed spindle shaft 24 and plate body 65 is attached to fixed spindle shaft 24 via fastener 66 disposed through aperture 72. In the embodiment shown fastener 66 is a screw and mates with a corresponding threaded bore of fixed spindle shaft 24. Significantly, structural vibrations of spindle motor 22 are transmitted to disk plate 64 rather than to disk drive cover 14 since plate body 65 is attached to fixed spindle shaft 24. Hence, disk drive cover 14 acts as a barrier to the acoustic noise generated by the structural vibrations and therefore, reduces the acoustic noise generated by disk drive 10.

Continuing with FIGS. 2a, 3, and 4, plate body 65 further includes an outer body raised portion 80 having a top surface coplanar with top surface of inner body portion 68 as shown in FIG. 2a. Raised portion 80 may be formed by any suitable operation such as a bending operation such that a bent portion 81 joins C-shaped outer body portion 70 and raised portion 80. Raised portion 80 defines a recess 82, which allows head stack assembly 28 to access a recording surface of disk 16 as best shown in FIG. 4. In the embodiment shown in FIG. 4, bent portion 81 reduces arm turbulence experienced by the top actuator arm when disk 16 is rotating during an operation of disk drive 10. Suitably, there may be a gap of approximately 1.5 mm. between C-shaped outer body portion 70 and disk 16. In one embodiment, disk plate 64 may be formed from a metallic material such as aluminum or stainless steel. In another embodiment, disk plate 64 may be formed from other rigid materials such as plastic, e.g., ultem plastic. In the embodiment shown in FIG. 4, the outer periphery of plate body 65 is co-extensive with the outer periphery of disk 16. However, in alternative embodiments, the diameter of the outer periphery of plate body 65 may be greater or less than the diameter of the outer periphery of disk 16.

Figure 2B:
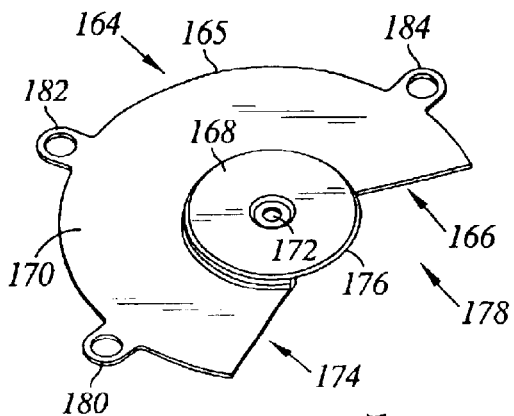
FIG. 2b is a perspective view of a disk plate in accordance with another embodiment of this invention.

With reference to FIG. 2b, a disk plate 164 in accordance with another embodiment is shown in which disk plate 164 includes a plate body 165 and a plurality of fastening members 180, 182, and 184. Plate body 165 includes an aperture 172, an inner body portion 168 and a generally C-shaped outer body portion 170. An opening 178 is defined by a first body side 166, a second body side 174 and a curved portion 176 of inner body portion 168. Opening 178 allows a head stack assembly, such as head stack assembly 28 (see FIG. 4), to access a recording surface of a disk

What is claimed is:

1. A disk drive comprising:

an enclosure including a disk drive base and a disk drive cover, disk for storing data;

a spindle motor attached to the disk drive base, the spindle motor for rotating the disk and including a fixed spindle shaft defining a longitudinal axis;

a disk plate attached to the disk drive base;

the disk plate including a plate body extending radially above the disk and spaced-apart longitudinally from the disk, the plate body attached to the fixed spindle shaft, wherein the plate body includes an inner body portion and a generally C-shaped outer body portion, the inner body portion being spaced-apart longitudinally at a distance greater from the disk than the outer body portion.

2. The disk drive of claim 1, wherein the plate body includes an aperture concentric with the fixed spindle shaft and the plate body is attached to the fixed spindle shaft via a fastener disposed through the aperture.

* * * * *